United States Patent
Waldschmidt-Schroer et al.

(10) Patent No.: US 10,596,515 B2
(45) Date of Patent: Mar. 24, 2020

(54) DEVICE FOR ATTENUATING AN EXHAUST-GAS NOISE, SYSTEM COMPRISING A DEVICE OF SAID TYPE, SORPTION DRYER HAVING A DEVICE OF SAID TYPE, AND METHOD FOR ATTENUATING AN EXHAUST-GAS NOISE

(71) Applicant: DONALDSON FILTRATION DEUTSCHLAND GMBH, Haan (DE)

(72) Inventors: Sylke Waldschmidt-Schroer, Erkrath (DE); Till Amtmann, Solingen (DE)

(73) Assignee: Donaldson Filtration Deutschland GmbH, Haan (DE)

( * ) Notice: Subject to any disclaimer, the term of this patent is extended or adjusted under 35 U.S.C. 154(b) by 170 days.

(21) Appl. No.: 15/539,030

(22) PCT Filed: Sep. 2, 2015

(86) PCT No.: PCT/EP2015/001767
§ 371 (c)(1),
(2) Date: Jun. 22, 2017

(87) PCT Pub. No.: WO2016/102033
PCT Pub. Date: Jun. 30, 2016

(65) Prior Publication Data
US 2018/0264400 A1    Sep. 20, 2018

(30) Foreign Application Priority Data
Dec. 22, 2014   (DE) .................. 10 2014 018 932

(51) Int. Cl.
*A47B 81/06* (2006.01)
*B01D 53/26* (2006.01)
(Continued)

(52) U.S. Cl.
CPC ....... *B01D 53/261* (2013.01); *B01D 53/0415* (2013.01); *B01D 53/0446* (2013.01); *B60T 17/004* (2013.01)

(58) Field of Classification Search
CPC .................. B01D 53/047; B01D 53/261; B01D 53/0415; B01D 53/0446; B60T 17/004
(Continued)

(56) References Cited

U.S. PATENT DOCUMENTS 3,147,097 A * 9/1964 Cayetano .................. F01N 1/24
                                                      181/227
3,154,388 A   10/1964 Purse
(Continued)

FOREIGN PATENT DOCUMENTS

CH      379836      7/1964
DE      60114894    5/2006

OTHER PUBLICATIONS

International Preliminary Report on Patentability, Written Opinion for PCT/EP2015/001767, dated, Jul. 6, 2017, pp. 7.
(Continued)

*Primary Examiner* — John P McCormack
(74) *Attorney, Agent, or Firm* — Sydney R. Kokjohn

(57) ABSTRACT

The invention relates to a device for attenuating an exhaust-gas noise, comprising a hollow chamber, which has an inlet for the exhaust gas, and comprising an absorber section, wherein the hollow chamber is closed form at the end spaced apart from the inlet, and the hollow chamber has, between the closed end and the inlet, a passage to the absorber section.

15 Claims, 5 Drawing Sheets

(51) Int. Cl.
*B01D 53/04* (2006.01)
*B60T 17/00* (2006.01)

(58) Field of Classification Search
USPC .......... 34/380; 181/222, 212, 207, 224, 227,
181/228, 252, 198, 204, 206, 257, 264,
181/265, 238, 239, 268, 275
See application file for complete search history.

(56) References Cited

U.S. PATENT DOCUMENTS

| | | | |
|---|---|---|---|
| 5,112,372 A | 5/1992 | Boeckermann et al. | |
| 8,418,805 B1 * | 4/2013 | Han | F01N 13/1888 181/212 |
| 2004/0261621 A1 | 12/2004 | Lindsay | |
| 2006/0289242 A1 * | 12/2006 | Oberer | B66B 11/0226 187/333 |
| 2011/0297478 A1 | 12/2011 | Billiet et al. | |
| 2011/0302800 A1 * | 12/2011 | Cheng | F26B 9/063 34/232 |
| 2012/0273302 A1 * | 11/2012 | Takagaki | F01N 1/02 181/228 |

OTHER PUBLICATIONS

International Search Report for PCT/EP2015/001767, dated Dec. 8, 2015, pp. 4.

* cited by examiner

17

DEVICE FOR ATTENUATING AN EXHAUST-GAS NOISE, SYSTEM COMPRISING A DEVICE OF SAID TYPE, SORPTION DRYER HAVING A DEVICE OF SAID TYPE, AND METHOD FOR ATTENUATING AN EXHAUST-GAS NOISE

This application is a national stage application under 35 U.S.C. 371 of PCT International Application No. PCT/EP2015/0017674, filed on Sep. 2, 2015, which claims priority to German Application No. 102014018932.5, filed on Dec. 22, 2014, which applications are incorporated herein by reference. To the extent appropriate, a claim of priority is made to each of the above disclosed applications.

The invention relates to a device for attenuating noise of an exhaust gas, a system comprising a device of said type, a sorption dryer having a device of said type, and a method for attenuating noise of an exhaust gas.

Pressurized fluids, in particular gases, very preferably compressed air, are required, for example, as drive and process energy in all areas of industrial and skilled manual production. Compressed air, in particular, must be dry, oil-free and clean, in order to avoid costly production losses. Compressed air is generally produced through the compression of air, that is to say a compressor draws in ambient air. The ambient air can contain pollutants, dirt particles and also moisture in the form of water vapor. The water vapor can condense in the compressed air in an uncontrolled manner and can lead to operational malfunctions and thus to considerable costs. In order to avoid the operational malfunctions, a pressurized fluid is usually supplied to a device for treatment, in order also to meet the requirements of the different areas of the application, for example clean-room requirements of the food or semiconductor industry.

Devices for drying and filtering a gas are known in various designs. In a preferred embodiment, devices of said type are designed as sorption dryers.

Sorption dryers generally serve for removing moisture from a gas, and in particular from a compressed gas such as for example compressed air. During the production of compressed air, a compressor draws in ambient air and compresses it. During the compression process, all constituents of the drawn-in air are concentrated according to the operating pressure, with a simultaneous increase in temperature. The absorption capacity of the compressed air for moisture remains approximately constant, however. The subsequent cooling thus leads to saturation of the compressed air with moisture, each further cooling leading to condensation of the excess moisture. Water is formed which, in the compressed air, can cause rust and corrosion in the entire downstream compressed-air system. It can also lead to icing. Rust, corrosion and icing lead to high consequential costs when carrying out maintenance, to losses of quality, in particular in applications which place high demands on the purity of the compressed air, such as for example applications in the food industry, in the pharmaceutical industry or in semiconductor technology, and to the premature failure of individual components up to the complete loss of production. Water and moisture must therefore be removed from the compressed-air system.

Known sorption dryers generally have at least two containers as partial sections of a tube line of the sorption dryer, in which containers at least one cartridge with a drying agent (sorbent)—frequently in the form of a bed of the granular drying agent—is arranged. Adsorbent drying agents are often used, while absorbent drying agents may also be used. The two containers, as partial sections of the tube line, are connected, by lines, parallel to one another and in each case to the inlet of the gas to be dried and to the outlet of the gas to be dried. The flow path of the gas is controlled via valves. A control unit performs the control of the valves. The control of the valves is in this case arranged so that, at all times, a container is flowed through by the gas to be dried. In said container, the gas is dried in that the moisture contained therein is bound by the drying agent contained in the container. In this phase, said container is therefore in a sorption or drying phase. During the sorption phase of the one container, the other container is (generally) flowed through in the opposite direction by part of the dried gas, in order to dry, that is to say regenerate, the sorbent saturated during a previous sorption phase. Accordingly, said container is in this case in the regeneration phase. If the sorbent is dried without an external supply of heat energy, that is to say only by a partial stream of the previously dried gas, this is a so-called cold regeneration. Warm regeneration of a sorption dryer is also known. In this case, the sorption container in the regeneration phase is regenerated by air which has been heated up through the supply of external energy. The air can either be a partial stream of the dried compressed air or, for example, ambient air can also be used. With regard to warm generation, electrical heating devices are regularly deployed for heating the air.

After a predefined time period of regeneration, dependent on the loading of the sorption dryer, it is required to reverse the valves in the supply and discharge lines in such a way that that container which has hitherto been in the sorption phase is regenerated and the container which was previously regenerated is now used for drying the gas.

Normally, the partial stream supplied to the container is discharged into the surroundings by means of a silencer during the regeneration phase. For high efficiency during generation and/or demoisturization, a flow resistance due to the silencer is to be selected to be as low as possible. At the same time, the silencer also has to attenuate the noise occurring in a pressure shock when reversing the supply and discharge lines.

DE 601 14 894 T2 discloses an exhaust silencer having inner and outer tubes for a compressed-air hand tool. The silencer comprises an inner tube and an outer tube, wherein the inner tube has a top, open end to draw in the exhaust air from the exhaust-air channel. The inner tube further has at least one other opening, which allows the exhaust air to flow out of the inner tube. The outer tube also comprises at least one air-stream opening. Depending on the pressure arrangement, the size of the openings in the tubes can be used to assist the control of the volume and of the speed of the ejection of the exhaust air. The outer tube is fixed in size to provide a passage between itself and the wall faces of a main region. During the application, exhaust air flows into the proximal inner tube end, flows out of the inner tube at at least one opening, flows out of the outer tube at at least one air-stream opening, passes through the passage between the inner tube and the wall faces of the main region, and flows out of the outlet opening. The winding path slows down the exhaust air and assists the attenuation of the exhaust-air sound.

The object of the invention was to provide a simply constructed device for attenuating noise of an exhaust gas with which it is possible to transfer relatively large amounts of compressed air, to create a pressure difference that is not too large, and to quietly discharge the exhaust gas. Furthermore, the object of the invention was to provide a system which is adaptable to different requirements, which has a device for attenuating noise of an exhaust gas, and with which at least a pressure difference that is not too large and/or relatively high efficiency is possible. Furthermore, a sorption dryer with a device and a method for attenuating noise of an exhaust gas should be provided.

Said object is achieved by the subject matter of the independent claims.

The basic idea of the invention is to take into consideration both high efficiency of the dryer with regard to the establishment of a pressure difference that is as small as possible, and the pressure shock which arises when changing over between regeneration and demoisturization, in order to attenuate in particular the high frequencies. According to the basic idea of the invention, during the pressure shock, that is to say the high pressurization of the gas, the air stream is divided in such a manner that the pressurized gas enters a hollow chamber which is of closed design at that end spaced apart from the inlet in order to form a reflection noise-attenuation section. A passage to an absorber section is formed between the inlet and the closed end. During the passage through the cavity and the reflection and/or deflection to the exhaust gas that is newly flowing into the hollow chamber, an averaging of the sound pressure amplitude occurs, which results in a reduction of the sound pressure peaks. As a result of the reflection, the low frequencies are attenuated. The passage allows the sound from the hollow chamber to reach an absorber section in which the sound energy is partially absorbed, that is to say is converted into heat. In the device, mainly the upper frequencies are attenuated by way of absorption. In the case of low pressurization of the exhaust gas, the exhaust gas can be divided immediately at the location of the passage, and can both be reflected in the hollow chamber and directly enter the absorber section.

In a preferred embodiment, the passage has a smaller cross-sectional area than the hollow chamber. The formation of the relatively small cross-sectional area of the passage in comparison with the cross-sectional area of the hollow chamber advantageously means that, in the case of high pressures, initially a reflection in the hollow chamber takes place and the highly pressurized exhaust gas is deflected to itself in order then to enter the absorber section through the passage and to exit into the surroundings. There are other conceivable embodiments, however, in which the passage has a somewhat larger cross-sectional area than the hollow chamber, for example 1.4 times or 1.6 times or 2 times the cross-sectional area of the hollow chamber. If, according to a preferred embodiment, a plurality of passages are provided, it is preferable if the sum of the cross-sectional areas of the passages is less than 2 times the cross-sectional area of the hollow chamber, particularly preferably less than 1.6 times, especially preferably less than 1.4 times, and very especially preferably less than the cross-sectional area of the hollow chamber.

In the context of the invention, an "exhaust gas" comprises any gas, in particular compressed air.

In the context of the invention, the term "hollow chamber" describes an elongate chamber which is initially not fixed with regard to its geometry and which in particular has no filling, very especially preferably has no fiber filling. The hollow chamber may in particular be of tubular design, wherein the cross section of the hollow chamber may be round or of polygonal shape. The cross section of the hollow chamber may be of elliptical or circular shape. Cross sections of the hollow chamber which have the shape of a polygon with a plurality of vertices is also possible.

The hollow chamber may be composed of a plurality of parts. For example, it is conceivable to use for the hollow chamber a tube, into the circumferential surface of which the passage is introduced and at one end of which the elements required for the inlet are formed, if appropriate by separate elements connected to the tube, and which is of closed design at that end thereof spaced apart from the inlet, for example by way of a closure element provided there. It is also conceivable to use two tubes for the hollow chamber which are arranged to be in line with one another. At one end of the first tube, the elements required for the inlet are formed, if appropriate by separate elements connected to the tube. At the end that is spaced furthest apart from the inlet, the second tube is formed in a closed manner, for example by way of a closure element provided there. The first tube and the second tube are connected at their remaining ends via a connecting piece. Said connecting piece may be a tubular connecting piece into which the passage is introduced. This can simplify the production of the hollow chamber, since the production steps which are essential for creating the passage may be performed separately at the connecting piece and the tubes in this regard may be left unworked. It is also conceivable to use the annular end surfaces, facing one another, of the tubes as delimiting faces for the passage. If the tubes are connected by an internal connecting piece, a passage in the form of an encircling gap may be formed by the annular end surfaces, facing one another, of the tubes. It is also conceivable, however, for a connecting piece connecting the two tubes to have projections which extend between the annular end surfaces, facing one another, of the tubes and thereby subdivide the originally encircling gap into circular segments. The use of said projections furthermore offers the advantage that the position of the remaining ends of the tubes relative to one another can be clearly defined.

The passage can have any shape, in particular the passage can have a round cross-sectional area, which may be of circular or elliptical shape. Cross-sectional areas of the passage of polygonal shape are likewise possible. The passage can also have the shape of a slot.

In the context of the invention, the term "absorber section" comprises a section in which the sound wave is at least partially absorbed, that is to say is converted into heat. The conversion or the effect of the sound absorption can be reinforced by way of multiple reflection.

The absorber section preferably at least partially surrounds the hollow chamber, whereby the shell of the hollow chamber, that is to say the outer surface of the hollow chamber, can be damped with corresponding absorber material. Consequently, the attenuation of the sound wave, which passes through the passage, can be attenuated, but also the structure-borne sound at the hollow chamber. The outer wall of the hollow chamber may be designed as an inner wall of the absorber section. The hollow chamber and the absorber section may be formed concentrically with respect to one another.

In a preferred embodiment, the absorber section comprises a porous material which may be rock wool, glass wool, glass fiber or in particular an open-cell melamine resin foam. This allows an easily usable material with good properties with regard to the processing to be used. The material in the absorber section may be correspondingly selected to have a high sound-absorption capacity, good thermal insulation properties, a high flame resistance, heat resistance and/or low weight. BASOTECT® produced by BASF SE can be used as a preferred material.

The passage is preferably formed in a region of the hollow chamber which is at a distance from the end that is spaced apart from the inlet of between $1/6$ and $5/6$, particularly preferably between 1/3 and 2/3, and especially preferably between 0.4 and 0.6 of the distance between the inlet and the spaced-apart end. The distance can preferably also be in range from 0.45 to 0.55 of the distance from the end that is spaced apart from the inlet to the inlet. Particularly preferably, the formation of the passage is at a distance from the end that is spaced apart from the inlet which is substantially 0.5 times the distance between the inlet and the spaced-apart end. As a result, it is possible for the highly pressurized exhaust gas entering through the inlet to be initially guided along a relatively long flow path in the hollow chamber, and for the exhaust gas reflected by the closed end to meet the newly entering exhaust gas substantially at the center of the hollow chamber in order then to enter the absorber section through the passage.

In a preferred embodiment, the size of the passage is smaller than the extent of the absorber section in the direction of the passage, such that the air stream is initially able to enter the absorber section without hindrance after passing through the passage.

The number of the passages can preferably be selected such that there are formed two or more passages to the absorber section at substantially the same height of the hollow chamber. Here, the size of the passages is selected such that, in the case of high pressurization, the exhaust gas entering through the inlet initially does not flow through the passages, but mostly past there, and is reflected at the end that is spaced apart from the inlet, and only then enters the absorber section through the passage or through the passages. Provision may also be made for the passage to be formed around the full circumference of the hollow chamber.

If a plurality of passages are provided, it is not necessary for these to be formed at the same height of the hollow chamber. Embodiments in which the passages are arranged in a distributed manner in a region of the hollow chamber are also possible. The passages are preferably all formed in a region of the hollow chamber which is at a distance from the end that is spaced apart from the inlet of between 1/6 and 5/6, particularly preferably between 1/3 and 2/3, and especially preferably between 0.4 and 0.6 of the distance between the inlet and the spaced-apart end. The distance can preferably also be in a range from 0.45 to 0.55 of the distance from the end that is spaced apart from the inlet to the inlet.

Preferably, the absorber section extends transversely with respect to the passage in such a manner that the exhaust gas downstream of the passage is deflected through 90° and is guided, at least partially, longitudinally with respect to the hollow chamber, whereby the effect of the sound absorption is reinforced by multiple reflection. Moreover, a compact device for attenuating noise of an exhaust gas can be obtained if the absorber section is routed, at least partially, longitudinally with respect to the hollow chamber. Air streams can arise which have an at least parallel portion with respect to the longitudinal axis of the hollow chamber.

In a preferred embodiment, the absorber section has outlets in two different directions. The absorber section can be formed in such a manner that, after passing through the passage, the exhaust gas is guided in two partial streams which substantially form an angle of 180° with respect to one another. As a result, provision can be made for an outlet of the device in the region of the inlet for the hollow chamber and a further outlet in the region of the end of the hollow chamber that is spaced apart from the inlet. The exhaust gas passing through the passage can be discharged on two paths which can have substantially the same flow resistance. The absorber section can extend from the passage in two opposite directions. The outlets adjoining the absorber section can have the same cross section. An outlet at one end can in particular be formed annularly around the hollow chamber.

In a preferred embodiment, the hollow chamber is extendable in its longitudinal extent in a modular manner such that, depending on the maximum pressure—which follows as a result of the pre-setting of the sorption dryer—arising during the pressure shock, a length of the hollow chamber adapted to said pressure shock is usable. Devices which are substantially of the same type can be connected to one another such that the hollow chambers are connected to one another in such a manner that a further hollow chamber, which extends the hollow chambers, is attached to the closed end spaced apart from the inlet. In the case of a pressure shock, the exhaust gas flowing into the device initially flows through the hollow chambers and is reflected at the then closed end of the added hollow chamber and meets the exhaust gas flowing through the inlet and then reaches the absorber section through the passage of the first device. The exhaust gas then flows through the absorber section and then passes into the surroundings.

At the closed end spaced apart from the inlet, the hollow chamber may have, for example, an outer thread onto which a cap for closing off the hollow chamber is screwable. After removing the cap, it is possible for a further device for attenuating the noise to be connected to the first device. For example, the two devices can be screwed to one another indirectly or directly, for example via an outer thread of the first device, wherein a sleeve having an inner thread is screwed onto the first and the second device, and thus a closed connection for forming a closed flow path is possible. The devices can also be inserted into one another. The outer thread described can also be formed as an inner thread into which a cap with an outer thread is screwed in. A plug and/or push/turn connections, for example in the form of a bayonet fastener, is also possible.

For improved handling, the device can have, at the end of the hollow chamber that is spaced apart from the inlet, an automatically-opening valve which opens automatically when connecting the end of the hollow chamber that is spaced apart from the inlet to a further device or to a hollow chamber module. The valve may also be designed as a solenoid valve.

The invention also provides a system comprising an aforementioned device, wherein two devices are connectable to one another in an end-to-end manner. The connection may be realized by means of screw, plug and/or push/turn connection.

The invention further provides a sorption dryer having an above described device, wherein the device is arranged, in a flow path, downstream of a container with sorbent, before the flow passed through the container passes into the surroundings.

In the context of the invention, a "sorption dryer" is understood to mean a device for drying a fluid, in which a filtering means for the fluid can additionally be provided. A pressurized fluid can accordingly be freed of moisture and, if appropriate, of particles, to a predefined quality or degree. A sorption dryer in the context of the invention can have an inlet and an outlet for the fluid, wherein, between the inlet and the outlet, one or more drying agents and/or filtering agents which can be flowed through by the fluid can be arranged. In the sorption dryer, it is possible to provide, downstream of the inlet in the flow direction of the fluid, a pre-filter in which the fluid can be freed of particles and condensate. The condensate that is formed can be discharged from the pre-filter via a condensate drain.

After the pre-filter, the fluid can be passed through a drying agent which is arranged in one or more cartridges as a granulate which may be a molecular sieve. The cartridges are situated in a container of the sorption dryer. At least one cartridge can be arranged in the container. It is also possible for there to be a plurality of cartridges in the container which are connected to one another directly or indirectly (by means of corresponding connecting pieces). The container may be part of the tube line of the sorption dryer. In a preferred embodiment, the interior of the container can be accessed by opening a cover and/or base arranged on an end side. The container can be opened and the cartridges can be inserted or removed. Above and below the container there are provided in the cover and/or base joining elements which can be connected to that cartridge in which the drying agent is held. A gas-tight connection is achieved via the connection of one of the sorption-dryer-side joining elements and the device and is necessary for achieving the desired demoisturization. The gas-tight connection must also be formed with every further device which is possibly inserted into the container, for example in the case of stacked cartridges.

In the drying agent held in the cartridge, the fluid can be dried to a required degree of dryness (pressure dewpoint). After the drying agent in the flow direction, provision can be made for a post-filter in which particles from the drying agent which possibly occur are retained. The outlet of the device may follow the post-filter, and the clean and dry fluid may reach a fluid-supply network and be used. It is possible for partial streams to be formed in the device. There may be two flow paths provided, wherein, in one flow path, there may be a drying agent in a drying cycle (adsorption phase) and, in another flow path, it is possible for a drying agent itself to be dried (regeneration phase). Provision may also be made for a partial stream of fluid already dried to be expanded to atmospheric pressure via a baffle, to be guided via the drying agent for the purpose of regeneration, and to be discharged to the surroundings via a valve, designed in particular as a solenoid valve, and, if appropriate, a silencer.

The term "cartridge" comprises a closed unit in which the drying agent is held. Preferably, such a pressure that the drying agent in the cartridge is immovable prevails between the drying agent and the cartridge. To this end, the drying agent is preferably filled into the cartridge and fixed therein in such a way that it is even immovable under the influence of relatively high gas speeds.

The invention further provides a method for attenuating noise of an exhaust gas exiting a sorption dryer.

The device according to the invention for attenuating noise of an exhaust gas and the system according to the invention are particularly preferably used for attenuating the noise of compressed air or nitrogen and other pressurized fluids, in particular which are used as energy sources, for example for the operation of compressed-air brakes in rail vehicles or for the driving of machinery underground in mining, for signal transmission (similar to electrical current), for cleaning, as a respiratory gas, for cooling. Particularly preferably, the device according to the invention is used for attenuating noise of an exhaust gas and the system according to the invention is used in systems in which a fluid pressure built up in a pressure chamber is changed abruptly by opening a valve. Particularly preferably, the device according to the invention for attenuating noise of an exhaust gas is not used for attenuating the noise of an exhaust gas of a combustion engine.

The term "at least one" used in the patent claims or in the description and also the indefinite article "a" used in the patent claims or in the description—including in corresponding grammatical formations in relation to gender and declension—comprise, with regard to the noun referred to that follows, exactly one or more than one, that is to say two, three, four, etc., of the elements described by the noun.

The invention will be described in more detail below on the basis of the exemplary embodiments illustrated in the drawings.

Figure 1:
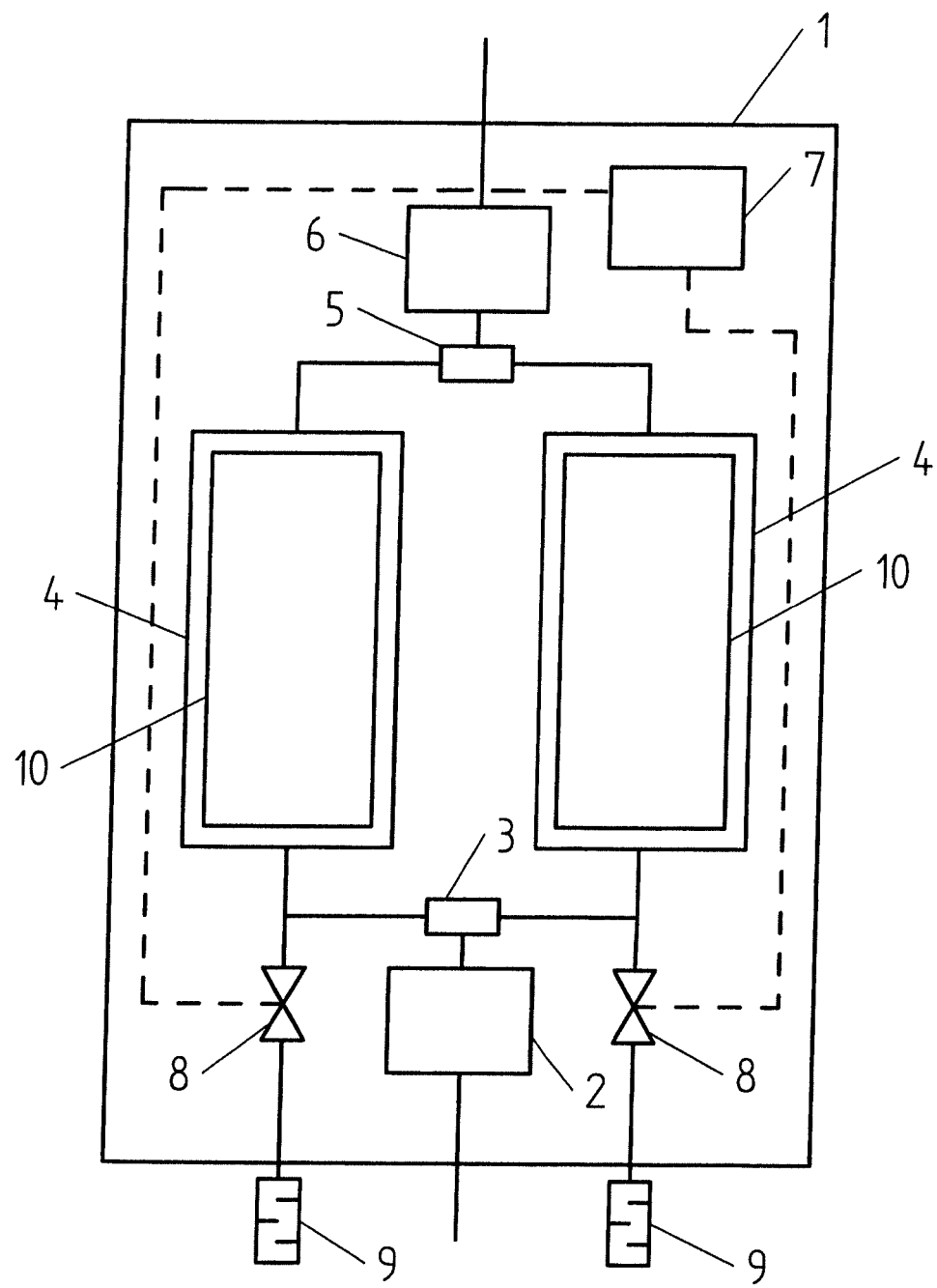
FIG. 1 shows a diagrammatic illustration of a sorption dryer having devices for attenuating noise of an exhaust gas.

FIG. 1 shows an exemplary embodiment of a sorption dryer for a fluid. The device has a housing 1 in which a flow path for the pressurized fluid is formed. A pre-filter 2 for extracting particles and condensate from the fluid is arranged after an inlet. Downstream, a changeover valve 3 following the pre-filter 2 is provided. Following the changeover valve 3 downstream there are containers 4, one in each of two mutually parallel flow paths in the tube lines. A device 10, designed as a cartridge, for holding a drying agent can be respectively inserted into the container 4. Also after the changeover valve 3 there is a solenoid valve 8 with which a connection to the surroundings via a device 9 for attenuating noise can be established.

A changeover valve 5 follows the container 4. Following the changeover valve 5 downstream there is a post-filter 6 in which abraded material of the drying agent can be retained. After the post-filter 6 there is the outlet of the sorption dryer from which the pressurized fluid can reach a fluid supply network in a dry and clean state and be used.

According to the exemplary embodiment shown in FIG. 1, the sorption dryer has a control unit 7 which has signal inputs and signal outputs. The control unit 7 controls the solenoid valves 8. Furthermore, the signal of a sensor which is arranged, in the flow direction, between the changeover valve 5 and the post-filter 6 and which serves for determining the moisture content of the fluid can be detected. The control unit 7 can detect, monitor and/or control states of the sorption dryer.

Figure 2:
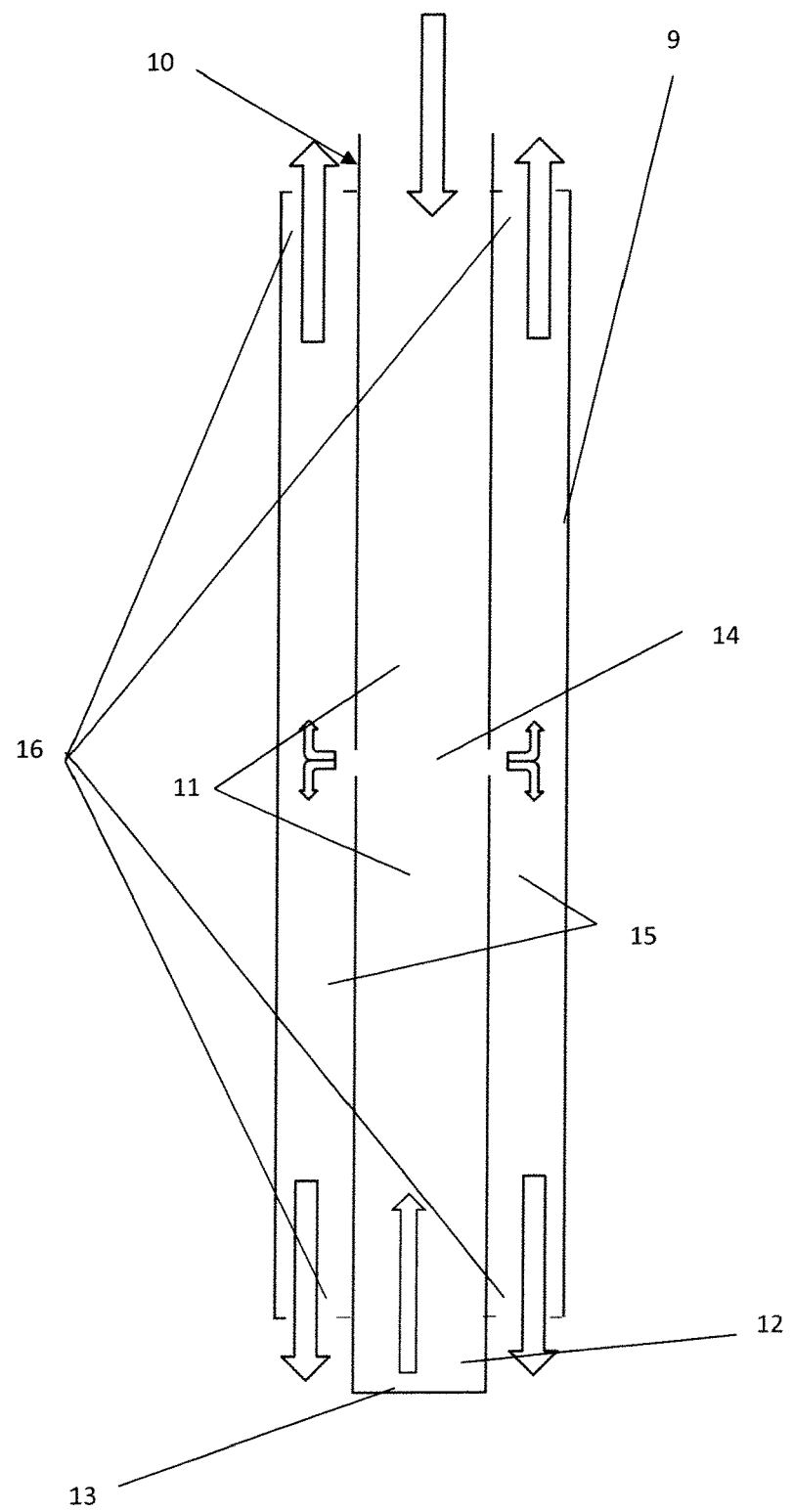
FIG. 2 shows in a sectional illustration a device for attenuating noise of an exhaust gas.

FIG. 2 diagrammatically shows an embodiment of a device 9 for attenuating noise of an exhaust gas.

The exhaust gas 10 can enter the device 9 via an inlet 10, and reaches a hollow chamber 11 which substantially has no filling. Highly pressurized exhaust gas is reflected at the end 12 of the device 9 that is spaced apart from the inlet 10 at the closed end 13 of the hollow chamber 11, and is deflected to the newly flowing exhaust gas flowing in through the inlet 10. Consequently, a reflection noise-attenuation section is formed. The exhaust gas which is then slowed down enters an absorber section 15, which is filled with an open-cell melamine resin foam, through a passage 14 of annular form. The passage 14 is formed annularly around the hollow chamber 11. The passage 14 is substantially at a distance from the closed end 13 of the hollow chamber 11 that corresponds approximately to 0.5 of the distance between the inlet 10 and the closed end 13.

Following the entry of the exhaust gas into the absorber section 15, the exhaust gas is deflected through 90° and, by means of the open-cell melamine resin foam, the sound energy of the exhaust gas is converted into heat.

The absorber section 15 surrounds the hollow chamber 11 around the full circumference, wherein the absorber section 15 is shorter than the length of the hollow chamber 11. On the end side, the hollow chamber 11 is opposite the absorber section 15; the hollow chamber 11 is longer than the absorber section 15. At the adjacent end of the hollow chamber in the vicinity of the inlet 10 and in the vicinity of the closed end 13 of the hollow chamber 11, the absorber section 15 respectively has an outlet 16 which is formed annularly around the hollow chamber.

In the embodiment of a device 9 for attenuating noise of an exhaust gas according to FIG. 2, exhaust gas which is pressurized to a relatively low pressure can enter the device 9 via the inlet 10. The exhaust gas which undergoes only low pressurization can flow into the absorber section 15 via the passage 14.

Figure 3:
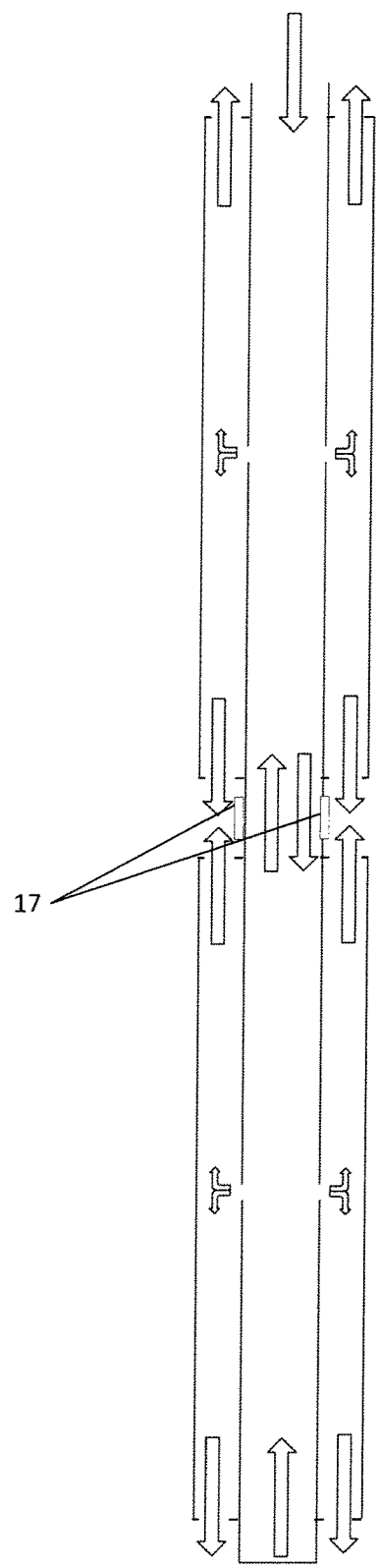
FIG. 3 shows in a sectional illustration two devices connected to one another for attenuating noise of an exhaust gas.

FIG. 3 diagrammatically shows in a sectional illustration two devices 9 which are connected to one another in an end-to-end manner in order to form a hollow chamber of a larger length. The devices 9 are connectable to one another by means of the ends of the hollow chamber 11 which project with respect to the absorber section 15 and on which fastening means can be formed. FIG. 3 shows two devices 9 connected to one another, wherein a larger number of devices 9 connectable to one another can also be formed, for example by attaching a further device 9 to the device 9 shown on the right in FIG. 3 in an end-to-end manner. A sleeve 17 with an inner thread is shown as a fastening or connecting means, into which are screwed the end-side walls of the hollow chamber 11 of the two devices 9 with corresponding outer threads. The previously closed end 13 of the device 9 illustrated in FIG. 2 is connected to an inlet 10 of a further device 9, and the two devices 9 are fluidically connected by means of their hollow chambers 11. The closed end 13 of the second device 9 then represents the closed end of the two hollow chambers 11 of the device 9. When exhaust gas enters via the inlet 10 of the device 9 on the left-hand side, which gas is highly pressurized, the exhaust gas initially flows through the hollow chambers 11 and is reflected at the closed end 13. The previously highly-pressurized exhaust gas passes through the passage 14 of the left one of the two devices 9 in FIG. 3 from the hollow chamber 11 into the absorber section 15, and flows through the latter.

Exhaust gas at low pressure in the two devices 9 of FIG. 3 passes through the passages 14 of the two devices 9 without any significant reflection at the closed end 13 of the hollow chamber 11, and flows through the absorber section 15.

Figure 4:
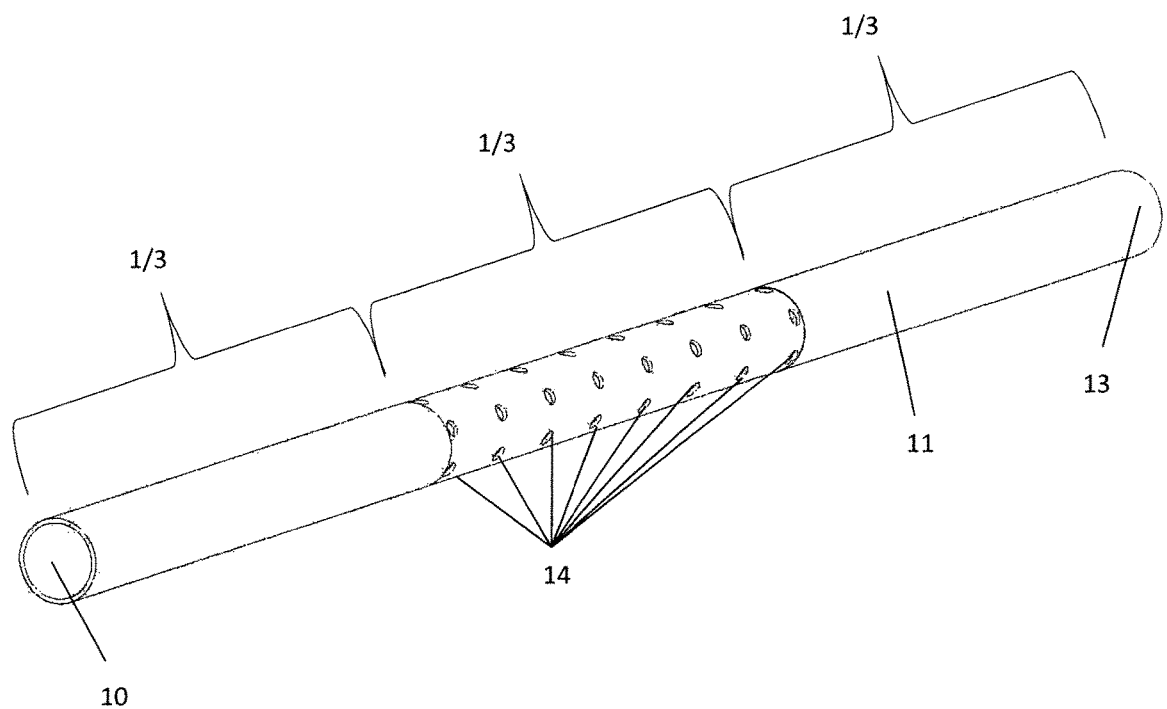
FIG. 4 shows a perspective view of a first embodiment of a hollow chamber for the device according to the invention.

FIG. 4 shows in a perspective view a first design of a hollow chamber 11, as can be used for the device according to the invention. The hollow chamber 11 has an inlet 10 (not shown in further detail with regard to its joint geometry). The hollow chamber 11 further has a closed end 13. A plurality of passages 14 in the form of circular openings are provided in a region of the hollow chamber which is at a distance from that the end 13 that is spaced apart from the inlet 10 of between ⅓ and ⅔ of the distance between the inlet 10 and the spaced-apart end 13

Figure 5:
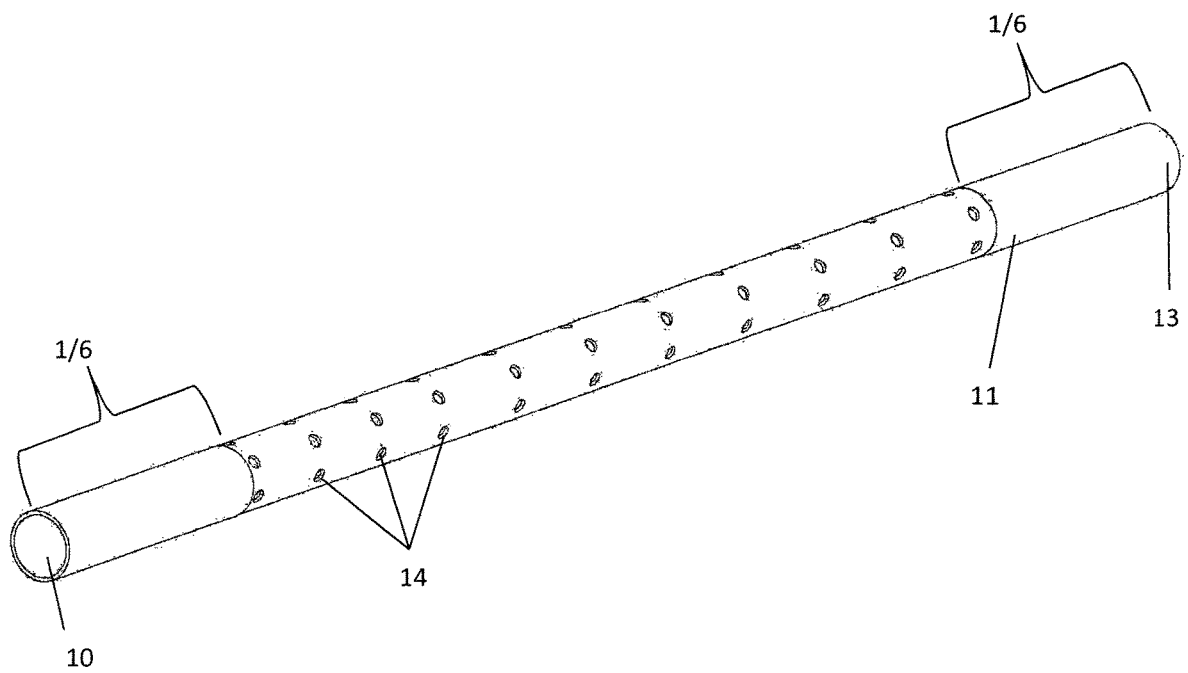
FIG. 5 shows a perspective view of a second embodiment of a hollow chamber for the device according to the invention.

FIG. 5 shows a design of a hollow chamber 11 which is comparable with the design shown in FIG. 4, as can be used for the device according to the invention. However, in the hollow chamber in FIG. 5, a plurality of passages in the form of circular passages 14 are provided in a region of the hollow chamber which is at a distance from the end 13 that is spaced apart from the inlet 10 of between ⅙ and ⅚ of the distance between the inlet 10 and the spaced-apart end 13.

Figure 6:
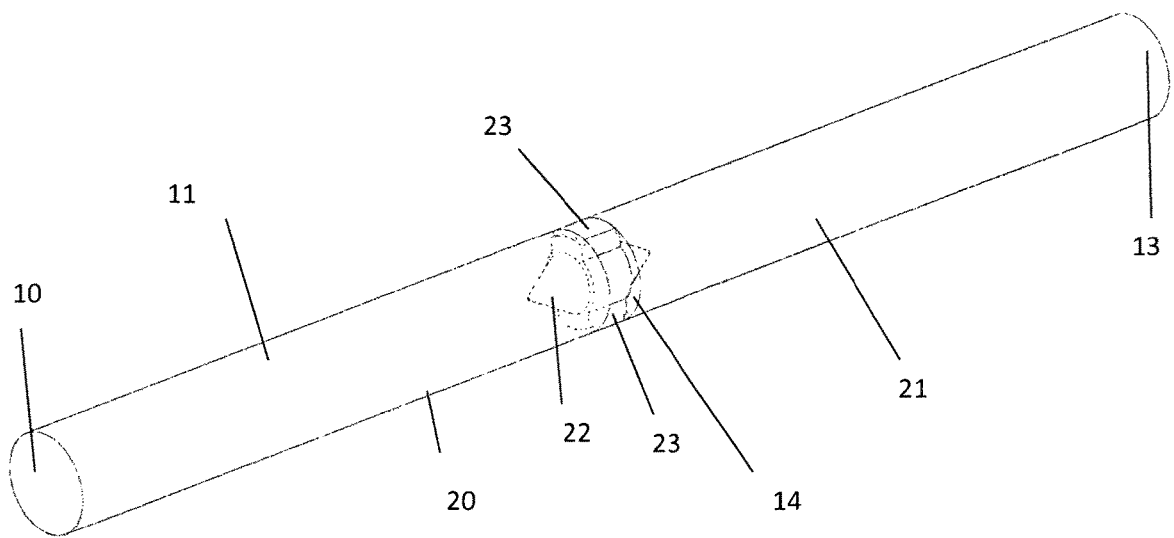
FIG. 6 shows a perspective view of a third embodiment of a hollow chamber for the device according to the invention.

Whereas the hollow chambers 11 of FIGS. 4 and 5 are each formed with one tube, in the circumferential surface of which the passages 14 are introduced as holes, FIG. 6 shows an embodiment of a design of a hollow chamber 11 which is formed with two tubes 20, 21.

The tubes 20, 21 are arranged in line with one another. At one end of the first tube 20, the elements required for the inlet 10 (not shown in more detail in FIG. 6) are formed. At the end 13 that is spaced furthest apart from the inlet, the second tube 21 is formed in a closed manner, for example by way of a closure element provided there (not shown in more detail in FIG. 6) or, for example, by way of a valve. The first tube 20 and the second tube 21 are connected at their remaining ends via a connecting piece 22. The connecting piece 22 connecting the two tubes 20, 21 has projections 23 which extend between the annular end surfaces, facing another, of the tubes 20, 21. As a result, an encircling gap initially formed between the annular end surfaces, facing one another, of the tubes 20, 21 is subdivided into circular segments. The respective passage 14 is then delimited by the oppositely-positioned edges of two adjacent projections 23 and the segment sections, situated between the adjacent projections 23, of the annular end surfaces of the tubes 20 and 21. A number of passages 14, which corresponds to the number of projections 23 of the connecting piece 22, are provided around the circumference of the hollow body.

The invention claimed is:

1. A device for attenuating noise of an exhaust gas, comprising a hollow chamber having an inlet for the exhaust gas and an absorber section, wherein the hollow chamber includes an inlet and a closed, wherein the hollow chamber has, between the closed end and the inlet, at least one passage to the absorber section, wherein the passage is arranged in a region of the hollow chamber which is at a distance from the closed end of between ⅙ and ⅚ of the distance between the inlet and the closed end, and wherein all passages are formed in the region of the hollow chamber.

2. The device according to claim 1, wherein the passage has a smaller cross-sectional area than the hollow chamber.

3. The device according to claim 1, wherein the absorber section at least partially surrounds the hollow chamber.

4. The device according to claim 1, wherein the absorber section comprises a porous material.

5. The device according to claim 1, wherein the passage is formed in the region of the hollow chamber which is at a distance from the closed end of between ⅓ and ⅔ of the distance between the inlet and the closed end.

6. The device according to claim 1, wherein a diameter of the passage is smaller than a width of the absorber section.

7. The device according to claim 6, wherein there are formed two passages to the absorber section, and wherein the two formed passages are arranged at about the same distance from the inlet.

8. The device according to claim 1, wherein the absorber section extends transversely with respect to the passage in such a manner that the exhaust gas downstream of the passage is deflected through 90° and is guided, at least partially, longitudinally with respect to the hollow chamber.

9. The device according to claim 1, further comprising outlets facing in two different directions.

10. The device according to claim 1, wherein the hollow chamber is extendable in its longitudinal extent in a modular manner.

11. The device according to claim 10, wherein the end of the hollow chamber that is spaced apart from the inlet has an automatically-opening valve which opens automatically when connecting the closed end of the hollow chamber that is spaced apart from the inlet to a further hollow chamber.

12. A system comprising a device according to claim 1, wherein two devices are connectable to one another in an end-to-end manner.

13. A sorption dryer having a device according to claim 1, wherein the device is arranged, in a flow path, downstream of a container with sorbent.

14. The device according to claim 1, wherein the absorber section comprises an open-cell melamine resin foam.

15. The device according to claim 1, wherein the passage is formed in a region of the hollow chamber which is at a distance from the closed end of between 0.4 and 0.6 of the distance between the inlet and the closed end.

* * * * *